US010183598B2

(12) United States Patent
Müller et al.

(10) Patent No.: US 10,183,598 B2
(45) Date of Patent: Jan. 22, 2019

(54) DEVICE FOR THE VARIABLE FIXING OF A HEADREST TO A SEAT OF A VEHICLE

(71) Applicant: ILLINOIS TOOL WORKS INC., Glenview, IL (US)

(72) Inventors: Manfred Müller, Georgensgmünd (DE); Ricard Fortuny, Sabadell (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/538,672

(22) PCT Filed: Dec. 31, 2015

(86) PCT No.: PCT/US2015/068255
§ 371 (c)(1),
(2) Date: Jun. 22, 2017

(87) PCT Pub. No.: WO2016/118303
PCT Pub. Date: Jul. 28, 2016

(65) Prior Publication Data
US 2017/0334328 A1 Nov. 23, 2017

(30) Foreign Application Priority Data
Jan. 20, 2015 (DE) .................. 10 2015 100 751

(51) Int. Cl.
*B60N 2/818* (2018.01)
*B60N 2/815* (2018.01)
*B60N 2/897* (2018.01)

(52) U.S. Cl.
CPC ............ *B60N 2/818* (2018.02); *B60N 2/815* (2018.02); *B60N 2/897* (2018.02)

(58) Field of Classification Search
CPC ...... B60N 2/4814; B60N 2/815; B60N 2/818; B60N 2/897
(Continued)

(56) References Cited

U.S. PATENT DOCUMENTS

2003/0151290 A1* 8/2003 Gans ................... B60N 2/821
297/410
2004/0217640 A1 11/2004 Kreitler
(Continued)

FOREIGN PATENT DOCUMENTS

DE 19919335 11/2000
DE 102010022293 12/2011
FR 2578299 9/1986

OTHER PUBLICATIONS

PCT, International Search Report and Written Opinion, International Application No. PCT/US2015/068255; dated Apr. 5, 2016, 10 pages.

*Primary Examiner* — Milton Nelson, Jr.
(74) *Attorney, Agent, or Firm* — Thompson Hine LLP

(57) ABSTRACT

A device for the variable fixing of a headrest to a vehicle seat, having a receptacle (1), which forms a receiving space (5) for receiving a headrest support (6), and having a locking rocker (7) which, by means of an actuation movement of an actuation element (11), can be rotated from a locking position, in which a locking section (18) of the locking rocker (7) projects into the receiving space, into a release position, in which the locking section (18) does not project into the receiving space or projects into the receiving space (5) to a lesser extent than in the locking position, is characterized in that the direction of the actuation movement is not oriented perpendicular to the axis of rotation (25) about which the locking rocker (7) is rotatable.

16 Claims, 2 Drawing Sheets

Figure 1:
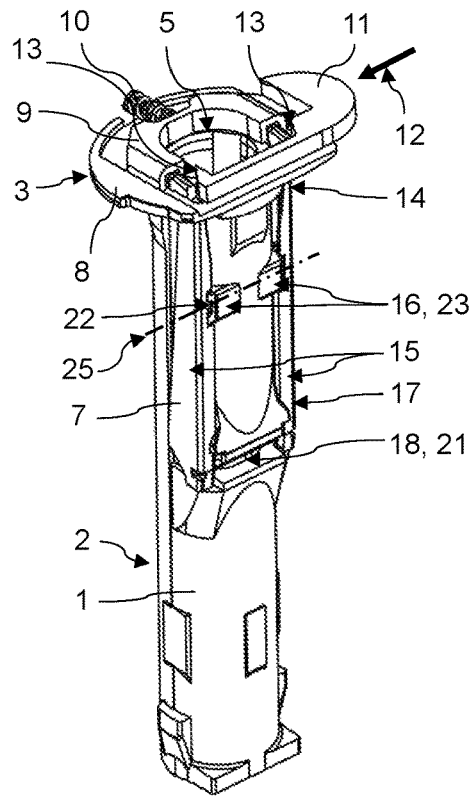

(58) Field of Classification Search
USPC .......................................................... 297/410
See application file for complete search history.

(56) References Cited

U.S. PATENT DOCUMENTS

2006/0061188 A1    3/2006  Locke et al.
2010/0194167 A1*   8/2010  Gans ..................... B60N 2/818
                                                297/410

* cited by examiner

DEVICE FOR THE VARIABLE FIXING OF A HEADREST TO A SEAT OF A VEHICLE

The invention relates to a device for the variable fixing of a headrest to a seat of a vehicle, having a receptacle which forms a receiving space for receiving a headrest support, and having a locking rocker which, by means of an actuation movement of an actuation element, can be rotated from a locking position, in which a locking section of the locking rocker projects into the receiving space, into a release position, in which the locking section does not project into the receiving space or projects into the receiving space to a lesser extent than in the locking position. The invention furthermore relates to a headrest system having a headrest and having such a device for the variable fixing of the headrest. In addition, the invention relates to a vehicle seat having such a headrest system.

A device of the type in question for the variable fixing of a headrest to a seat of a vehicle is known from DE 199 19 335 B4. In the case of the device described there, the actuation element, which is designed as a pushbutton, for the actuation of the locking rocker is displaced in a direction which is oriented perpendicular to the axis of rotation about which the locking rocker is rotatably mounted. Accordingly, one end section of the locking rocker is pressed down by means of the pushbutton and, as a result, the other end section is lifted off the receptacle, and therefore a locking section arranged on said end section is moved out of the receiving space.

The device known from DE 199 19 335 B4 is distinguished by a simple structural design, in particular because the locking system of the device substantially consists of just three components, namely the locking rocker, the pushbutton and a spring element loading the locking rocker into the locking position. However, a disadvantage of the device known from DE 199 19 335 B4 may be the arrangement of the actuation element and the orientation of the actuation direction of said actuation element relative to the locking rocker, which arrangement, depending on the integration of the device into the backrest of a vehicle seat and the shape of the headrest held by means of the device, may lead to poor accessibility and therefore to poor handleability of the actuation element.

The invention was based on the object of specifying a device for the variable fixing of a headrest to a seat of a vehicle, which device is designed structurally as simply as the device known from DE 199 19 335 B4, but can permit better handleability of the actuation element.

This object is achieved by means of a device as per patent claim 1. A headrest system with such a device is the subject matter of patent claim 9, and a vehicle seat with such a headrest system is the subject matter of patent claim 10. Advantageous refinements of the device according to the invention and therefore of the headrest system according to the invention and also of the vehicle seat according to the invention are claimed in the further patent claims and result from the description below of the invention.

A device of the generic type for the variable fixing of a headrest to a vehicle seat, which device comprises at least one receptacle, which forms a receiving space for receiving a headrest support of a headrest, and a locking rocker which, by means of an actuation movement of an actuation element, can be rotated from a locking position, in which a locking section of the locking rocker projects into the receiving space, into a release position, in which the locking section does not project into the receiving space or projects into the receiving space to a lesser extent than in the locking position, is characterized, according to the invention, in that the direction of the actuation movement is not oriented perpendicular, and is preferably oriented parallel to or coaxially, with respect to the axis of rotation about which the locking rocker is rotatable.

The refinement according to the invention of such a device for the variable fixing of a headrest therefore provides the integration of a transmission, which is preferably designed as simply as possible, between the actuation element, which is manually actuable for example, and the locking rocker, wherein said transmission transmits the movement of the actuation element and the forces required for this purpose to the locking rocker but, in the process, changes the direction of movement. By means of the variability achieved in this manner in respect of the orientation of the actuation direction of the actuation element with respect to the axis of rotation of the locking rocker and therefore with respect to the direction in which the two end sections of the locking rocker are deflected, an advantageous positioning for the actuation element can be achieved, which positioning, depending on the integration of the device in a headrest system and of said headrest system in a vehicle seat, can simplify the handling of the device, in particular for unlocking a headrest of the headrest system, which headrest is held in the device.

A headrest system according to the invention comprises, in addition to such a device, at least also a headrest which comprises at least one headrest support, wherein the headrest support is received within the receiving space of the receptacle in displaceable fashion when the locking rocker of the device is situated in the release position and in fixed fashion when the locking rocker is situated in the locking position.

A vehicle seat according to the invention is characterized in that such a headrest system is provided, wherein the receptacle of the device is at least partially integrated into a backrest of the vehicle seat.

In a preferred refinement of the device according to the invention, it can be provided that the locking rocker is loaded into the locking position by means of a spring element. The effect achieved by this is that the locking rocker is then always situated in the locking position thereof when said locking rocker is not actively brought into the release position by actuation of the actuation element. In addition, such a loading of the locking rocker by means of a spring element can effect an automatic resetting of the locking rocker into the locking position as soon as the actuation element is no longer actuated.

It is also possible, instead of loading the locking rocker, to load the actuation element by means of a spring element in such a manner that said actuation element in turn loads the locking rocker into the locking position. However, this may necessitate the actuation element and the locking rocker being coupled to each other in a force-transmitting manner both in the direction of the actuation movement and in the opposite direction thereto, which may lead to a structurally more complicated refinement of the device according to the invention.

In a furthermore preferred refinement of the device according to the invention, it can be provided that the actuation element makes contact with the locking rocker via a sliding surface which is oriented obliquely with respect to the direction of the actuation movement. This constitutes a structurally simple refinement of a transmission deflecting the direction of the actuation movement, which can be reflected in correspondingly low production costs for the device according to the invention. The (at least one) sliding surface can be formed here by the actuation element and/or the locking rocker.

Furthermore preferably, provision can be made for the locking rocker to have two rocker beams which are arranged spaced apart from each other and preferably run parallel to a longitudinal axis of the receiving space and which, in a central section, form a (optionally joint) rotary bearing element and which are connected to one another at a first end section by way of a connecting section. The connecting section here can particularly preferably form the locking section. Such a locking rocker can be produced in a simple manner and, for example, can be injection molded from plastic. It is also possible for such a locking rocker to be able to be integrated in a structurally advantageous manner into the receptacle of the device.

Furthermore, in the preferred refinement of the device according to the invention with a locking rocker designed in such a manner, provision can advantageously be made for the actuation element to make contact with both rocker beams at a second end section of the locking rocker via a sliding surface which is oriented obliquely with respect to the direction of the actuation movement. As a result, despite the comparatively filigree design of the locking rocker, a reliable transmission of the actuation force, which is exerted on the actuation element, to the locking rocker and the movement of the latter from the locking position into the release position can be ensured.

An advantageous development of such a refinement of the device according to the invention can then also make provision for the actuation element to be arranged exclusively in a head section of the receptacle. Head section is understood here as meaning a section of the receptacle that, when the device is integrated in the backrest of a vehicle seat, is arranged outside the backrest and in particular rests on an upper side of the backrest while an integration section of the receptacle is arranged within the backrest. The arrangement of the actuation element exclusively in such a head section of the receptacle can lead to simple shaping for the receptacle and the actuation element. In addition, such a design of the device may cause the two end sections of the rocker beams to extend into the head section of the receptacle, which may result in as long a design of the rocker beams as possible. As a result, an advantageous conversion of the actuation movement of the actuation element into the resulting movement of the locking section of the locking rocker between the locking position and the release position can be achieved.

The individual elements of the device according to the invention and of the headrest system and vehicle seat according to the invention can be of single-or multi-part design. It is therefore not required for the locking section to be a fixed component of the locking rocker. In particular, the locking rocker comprising the locking section also does not have to be of single-part design. Consequently, the locking section can also be a separate component which functionally interacts with a rocker part in order to form the locking rocker. However, a coupling should be provided between the rocker part and the separate locking section such that the rocker movement of the rocker part leads to a movement of the locking section between the locking position and the release position.

The indefinite articles ("a" and "an"), in particular in the patent claims and in the above description explaining the patent claims in general, should be understood as such and not as numerals. Components correspondingly substantiated therewith should therefore be understood as meaning that said components are present at least once and may be present more than once.

Figure 2:
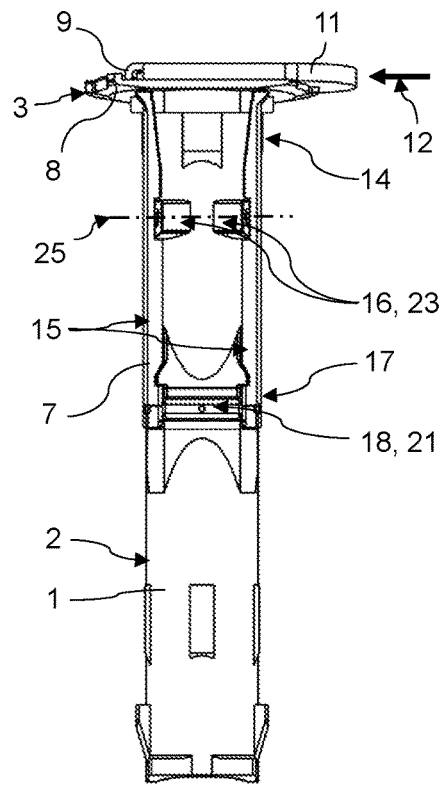
Figure 3:
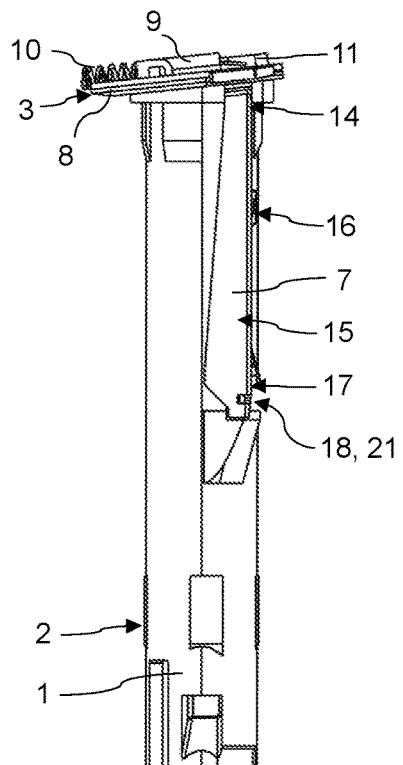
Figure 4:
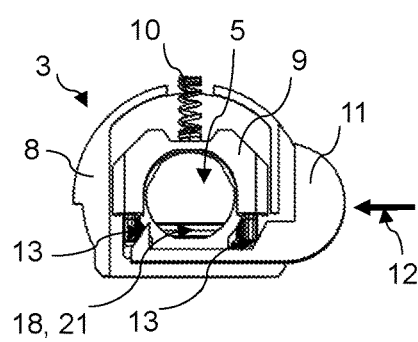
Figure 5:
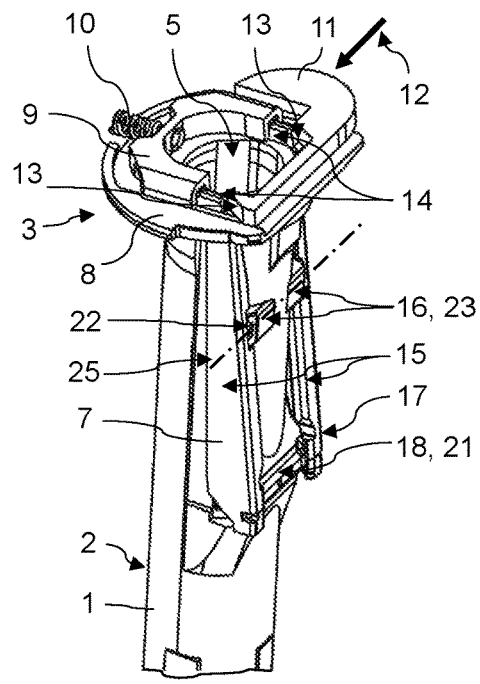
Figure 6:
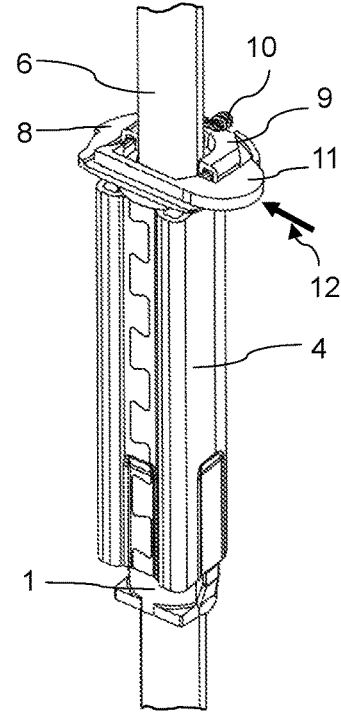
Figure 7:
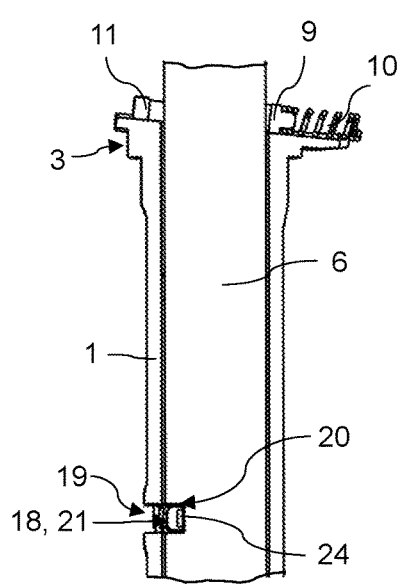
Figure 8:
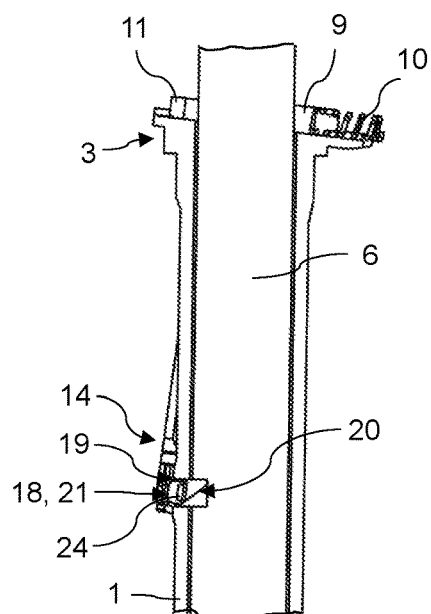

The invention is explained in more detail below with reference to an exemplary embodiment illustrated in the drawings. In the drawings:

FIG. 1: shows, in a perspective view, a device according to the invention with the locking rocker in the locking position thereof;

FIG. 2: shows the device according to FIG. 1 in a view from the rear;

FIG. 3: shows the device according to FIG. 1 in a side view;

FIG. 4: shows the device according to FIG. 1 in a top view;

FIG. 5: shows the device with the locking rocker in the release position thereof;

FIG. 6: shows a headrest system according to the invention with a device according to FIGS. 1 to 5 and a headrest support received in the device;

FIG. 7: shows a longitudinal section through the headrest system according to FIG. 6 (but without a housing) with the locking rocker in the locking position thereof; and FIG. 8: shows a longitudinal section through the headrest system according to FIG. 6 (but without a housing) with the locking rocker in the release position thereof.

The device illustrated in the drawings for the variable fixing of a headrest to a vehicle seat (not illustrated) comprises a receptacle 1 having a tubular integration section 2, which is of approximately hollow-cylindrical design, and a flat head section 3 which is arranged at one end of the integration section 2. The integration section 2 and a housing 4 of the device, said housing substantially completely surrounding the integration section 2 (cf. FIG. 6), are provided to be inserted and held in a corresponding mounting space in a backrest of the vehicle seat, while the head section 3 of the device is intended to be arranged outside the backrest and to rest with the lower side thereof on an upper side of the backrest.

The receptacle 1 forms a receiving space 5 which serves for receiving a headrest support 6 of a headrest (the other components of which are not illustrated) (cf. FIGS. 6 to 8), wherein the headrest support 6 is received within the receiving space 5 in displaceable fashion when a locking rocker 7 of the device is situated in the release position thereof, and is received in fixed fashion when the locking rocker 7 is situated in the locking position thereof.

The head section 3 of the receptacle 1 comprises a base part 8, which is fixedly connected to the integration section 2 of the receptacle 1, and a cover (not illustrated in the drawings). The base part 8 and the cover of the head section 3 form an interior space, within which a U-shaped slide 9 is mounted in displaceable fashion, wherein a spring element 10 is supported between the slide 9 and the cover. Furthermore, a functional section of an actuation element 11 is positioned within said interior space, while an actuation section of the actuation element 11 projects out of the head section 3. By manual actuation of said actuation element 11, the locking rocker 7, which is coupled to the latter, can be rotated or pivoted from the locking position, as illustrated in FIGS. 1 to 4 and 7, into a release position, as illustrated in FIGS. 5, 6 and 8. An actuation takes place by a displacement of the actuation element 11 into the head section 3 and therefore approximately parallel to an axis of rotation 25 of the locking rocker 7, wherein two sliding surfaces 13 of the actuation element 11, which sliding surfaces are oriented obliquely with respect to this direction of the actuation movement 12, slide along edges of two rocker beams 15 in the region of a (second) end section 14 of the locking rocker 7, as a result of which said second end section 14 of the locking rocker 7 is deflected in a direction which is oriented perpendicular to the direction of the actuation movement 12. Said deflection of the second end section 14 of the locking rocker 7, which end section is coupled to the actuation element 11, leads as a consequence of the rotational mounting 16 of the locking rocker 7 (in a central section) to a deflection of a first end section 17 of the locking rocker 7, which first end section is opposite the second end section 14 with respect to the rotational mounting 16, in the opposite direction. As a result, a locking section 18 of the locking rocker 7, which locking section, in the locking position, is partially positioned within the receiving space 5 formed by the receptacle 1 (for which purpose the receptacle 1 forms a corresponding through opening 19; cf. FIG. 7), is moved completely out of the receiving space 5, as a result of which the locking section 18 is brought out of engagement in one (of a plurality of, otherwise not shown) locking grooves 20 of the headrest support 6 (cf. FIG. 8). As a result, the headrest support 6 and therefore the headrest are no longer fixed in the device 1, and the headrest support 6 can on the contrary be displaced within the receiving space 5 or pulled completely out of the latter. In the release position of the locking rocker 7, the device therefore permits a height adjustment and removal of the headrest while, in the locking position of the locking rocker 7, a designated positioning of the headrest relative to the backrest of the vehicle seat is secured by engagement of the locking section 18 in one of the locking grooves 20.

A deflection of the second end section 14 of the locking rocker 7 as a consequence of actuation of the actuation element 11 leads simultaneously to a displacement of the slide 9 likewise bearing against said second end section 14, and this is associated, in turn, with an increasing pretensioning of the spring element 10. When the actuation element 11 is relieved of load, said increasing pretensioning of the spring element 10 brings about an automatic resetting of the locking rocker 7 into the locking position by the slide 9, which is loaded by the spring element 10, moving the second end section 14 of the locking rocker 7 back in the direction opposed to the previous deflection and, in the process, also moving the actuation element 11 back into the unloaded initial position thereof. Said loading of the locking rocker 7 into the locking position thereof by means of the spring element 10 not only ensures that a height adjustment of the headrest is possible only when this is actively initiated by pressing the actuation element 11, but, as a result, the locking section 18 is also automatically latched into one of the locking grooves 20 of the headrest support 6 as soon as said locking grooves 20 are positioned within the receiving space 5 adjacent to the locking section 18.

The locking section 18 is formed by a connecting section 21 of the locking rocker 7. Said connecting section 21 connects the two rocker beams 15 to each other.

The rotational mounting 16 of the locking rocker 7 is formed by a respective rotational mounting element in the form of a bearing journal 22 which each of the rocker beams 15 forms in conjunction with a respectively associated bearing receptacle 23 which are integrated in the integration section of the receptacle 1.

The receptacle 1, which, for example, is formed integrally, the locking rocker 7, the slide 9 and the actuation element 11 can preferably be formed from plastic and, for example, by injection molding. The cover of the head section 3 and the slide 9 can advantageously likewise be formed as a respectively integral component. This can also take place by means of injection molding, for which purpose said components are preferably shaped in such a manner that said components essentially do not form any undercuts.

After the slide 9, the spring element 10 and the actuation element 11 are installed, the cover can be connected releasably or non-releasably to the base part 8 of the head section 3. A releasable connection can be achieved by means of a latching connection. A non-releasable connection can take place in particular in an integrally bonded manner (for example by adhesive bonding or welding) or positively, for example by means of a latching connection (which cannot be released without destruction).

If the locking rocker 7 is entirely formed from plastic, said locking rocker can likewise be formed integrally. However, it can preferably be provided that the locking section 21 of the locking rocker 7 is at least partially formed from a metallic reinforcing element 24 (cf. FIGS. 7 and 8) which is connected to the connecting section 21, which is formed from plastic (and preferably in one part with the rocker beam 15 and the bearing journal 22). Said reinforcing element 24 can prevent damage to the locking section 21 in the event of heavy loading (in the displacement directions) of the headrest fixed in the device.

The housing 4 of the device is preferably formed from (sheet) metal since high loads, as may occur, for example, by the impact of a head of a vehicle occupant in the event of the vehicle accommodating the vehicle seat being involved in an accident, are intended to be supported on a supporting structure of the backrest of the vehicle seat by means of the housing 4.

LIST OF REFERENCE SIGNS 1 receptacle
2 integration section
3 head section
4 housing
5 receiving space
6 headrest support
7 locking rocker
8 base part
9 slide
10 spring element
11 actuation element
12 direction of the actuation movement
13 sliding surface
14 second end section of the locking rocker
15 rocker beam
16 rotational mounting
17 first end section of the locking rocker
18 locking section
19 through opening of the receptacle
20 locking groove
21 connecting section
22 bearing journal
23 bearing receptacle
24 reinforcing element
25 axis of rotation

The invention claimed is:

1. A device for variable fixing of a headrest to a vehicle seat, having a receptacle (1), which forms a receiving space (5) for receiving a headrest support (6), and having a locking rocker (7) which, by means of an actuation movement of an actuation element (11), can be rotated from a locking position, in which a locking section (18) of the locking rocker (7) projects into the receiving space (5), into a release position, in which the locking section (18) does not project into the receiving space (5) or projects into the receiving space (5) to a lesser extent than in the locking position, characterized in that the direction of the actuation movement (12) is not oriented perpendicular to the axis of rotation (25) about which the locking rocker (7) is rotatable.

2. The device as claimed in claim 1, characterized in that the direction of the actuation movement (12) is oriented parallel to or coaxially with respect to the axis of rotation (27).

3. The device as claimed in claim 1, characterized in that the locking rocker (7) is loaded into the locking position by means of a spring element (10).

4. The device as claimed in claim 1, characterized in that the actuation element (11) makes contact with the locking rocker (7) via a sliding surface (13) which is oriented obliquely with respect to the direction of the actuation movement (12).

5. The device as claimed in claim 1, characterized in that the locking rocker (7) has two rocker beams (15) which are arranged spaced apart from one another and which, in a central section, each form a rotary bearing element and which are connected to one another at a first end section (17) by way of a connecting section (21).

6. The device as claimed in claim 5, characterized in that the connecting section (21) forms the locking section (18).

7. The device as claimed in claim 5, characterized in the actuation element (11) makes contact with both rocker beams (15) at a second end section (14) of the locking rocker (7) via two sliding surfaces (13) which are oriented obliquely with respect to the direction of the actuation movement (12).

8. The device as claimed in claim 1, characterized in that the actuation element (11) is arranged exclusively in a head section (3) of the receptacle (1).

9. A headrest system having a headrest which comprises a headrest support (6), and having a device according to claim 1, wherein the headrest support (6) is received within the receiving space (5) of the receptacle (1) in displaceable fashion when the locking rocker (7) is situated in the release position, and in fixed fashion when the locking rocker (7) is situated in the locking position.

10. A vehicle seat having a headrest system as claimed in claim 9, wherein the receptacle (1) of the device is at least partially integrated into a backrest of the vehicle seat.

11. A device for variable fixing of a headrest to a vehicle seat, the device having a receptacle forming a receiving space for receiving a headrest support, and having a locking rocker movable by an actuation element so as to be rotated from a locking position, in which a locking section of the locking rocker projects into the receiving space, into a release position, in which the locking section does not project into the receiving space or projects into the receiving space to a lesser extent than in the locking position, wherein a direction of actuation movement of the actuation element is not oriented perpendicular to an axis of rotation about which the locking rocker is rotatable.

12. The device as claimed in claim 11, wherein the direction of actuation movement is oriented parallel to or coaxially with respect to the axis of rotation.

13. The device as claimed in claim 12, wherein the locking rocker is biased into the locking position by a spring element.

14. The device as claimed in claim 13, wherein the actuation element makes contact with the locking rocker via a sliding surface that is oriented obliquely with respect to the direction of actuation movement.

15. The device as claimed in claim 14, wherein the locking rocker has two rocker beams arranged spaced apart from one another and which, in a central section, each form a rotary bearing element and which are connected to one another at a first end section by way of a connecting section.

16. The device as claimed in claim 15, characterized in that the connecting section forms the locking section.

* * * * *